(12) United States Patent
Lowe et al.

(10) Patent No.: US 8,217,931 B2
(45) Date of Patent: Jul. 10, 2012

(54) SYSTEM AND METHOD FOR PROCESSING VIDEO IMAGES

(75) Inventors: Danny D. Lowe, Calgary (CA); David A. Spooner, Calgary (CA); Gregory R. Keech, Calgary (CA); Christopher Levi Simmons, Calgary (CA); Natascha Wallner, Calgary (CA); Steven Birtwistle, Calgary (CA); Jonathan Adelman, Calgary (CA)

(73) Assignee: Conversion Works, Inc., Calgary (CA)

( * ) Notice: Subject to any disclaimer, the term of this patent is extended or adjusted under 35 U.S.C. 154(b) by 0 days.

(21) Appl. No.: 13/072,467

(22) Filed: Mar. 25, 2011

(65) Prior Publication Data

US 2011/0169914 A1    Jul. 14, 2011

Related U.S. Application Data

(63) Continuation of application No. 12/046,267, filed on Mar. 11, 2008, now abandoned, which is a continuation-in-part of application No. 10/946,955, filed on Sep. 22, 2004, now Pat. No. 7,542,034.

(60) Provisional application No. 60/894,450, filed on Mar. 12, 2007.

(51) Int. Cl.
*G06T 1/00* (2006.01)

(52) U.S. Cl. ........ 345/418; 345/419; 345/420; 345/421; 345/581; 345/619

(58) Field of Classification Search .................. None
See application file for complete search history.

(56) References Cited

U.S. PATENT DOCUMENTS

| | | | |
|---|---|---|---|
| 4,689,616 A | 8/1987 | Goude et al. |
| 4,925,294 A | 5/1990 | Geshwind et al. |
| 5,614,941 A | 3/1997 | Hines |
| 5,977,978 A | 11/1999 | Carey et al. |
| 6,016,150 A | 1/2000 | Lengyel et al. |
| 6,151,404 A | 11/2000 | Pieper |
| 6,226,004 B1 | 5/2001 | Nishihara |
| 6,278,460 B1 | 8/2001 | Myers et al. |
| 6,342,887 B1 | 1/2002 | Munroe |
| 6,434,278 B1 | 8/2002 | Hashimoto |
| 6,456,745 B1 | 9/2002 | Bruton et al. |
| 6,466,205 B2 | 10/2002 | Simpson et al. |
| 6,477,267 B1 | 11/2002 | Richards |
| 6,549,200 B1 | 4/2003 | Mortlock et al. |

(Continued)

FOREIGN PATENT DOCUMENTS

EP    1 141 893    4/2005

(Continued)

OTHER PUBLICATIONS

Office Action issued for Japanese Patent Application No.: 2007-532366, dated Feb. 15, 2011, 7 pages with English translation.

(Continued)

*Primary Examiner* — Kee M Tung
*Assistant Examiner* — Jwalant Amin
(74) *Attorney, Agent, or Firm* — Fulbright & Jaworski L.L.P.

(57) ABSTRACT

Embodiments use point clouds to form a three dimensional image of an object. The point cloud of the object may be formed from analysis of two dimensional images of the object. Various techniques may be used on the point cloud to form a 3D model of the object which is then used to create a stereoscopic representation of the object.

14 Claims, 6 Drawing Sheets

U.S. PATENT DOCUMENTS

| | | | |
|---|---|---|---|
| 6,714,196 | B2 | 3/2004 | McCormack et al. |
| 7,181,081 | B2 | 2/2007 | Sandrew |
| 7,508,977 | B2 | 3/2009 | Lyons et al. |
| 2001/0040570 | A1 | 11/2001 | Light et al. |
| 2002/0030675 | A1 | 3/2002 | Kawai |
| 2002/0122113 | A1 | 9/2002 | Foote |
| 2002/0122585 | A1 | 9/2002 | Swift et al. |
| 2002/0186348 | A1 | 12/2002 | Covannon et al. |
| 2003/0090482 | A1 | 5/2003 | Rousso et al. |
| 2003/0164893 | A1 | 9/2003 | Mayhew |
| 2004/0247174 | A1 | 12/2004 | Lyons et al. |
| 2005/0052452 | A1 | 3/2005 | Baumberg |
| 2005/0094879 | A1 | 5/2005 | Harville |
| 2005/0117215 | A1 | 6/2005 | Lange |
| 2005/0223337 | A1* | 10/2005 | Wheeler et al. ............ 715/806 |
| 2006/0033762 | A1 | 2/2006 | Card et al. |
| 2006/0114253 | A1 | 6/2006 | Zitnick et al. |
| 2007/0009179 | A1 | 1/2007 | Easwar |
| 2007/0013813 | A1 | 1/2007 | Sun et al. |
| 2008/0056716 | A1 | 3/2008 | Fujikawa |
| 2008/0056719 | A1 | 3/2008 | Bernard et al. |
| 2008/0099682 | A1* | 5/2008 | Gordon et al. ............ 250/338.4 |

FOREIGN PATENT DOCUMENTS

| | | |
|---|---|---|
| JP | 10-111934 A | 4/1998 |
| WO | WO-2007/130122 | 11/2007 |
| WO | WO-2007/142643 | 12/2007 |
| WO | WO-2007/142649 | 12/2007 |
| WO | WO-2007/148219 | 12/2007 |
| WO | WO-2008/051231 | 5/2008 |
| WO | WO-2008/060289 | 5/2008 |
| WO | WO-2008/063167 | 5/2008 |
| WO | WO-2008/063170 | 5/2008 |
| WO | WO-2008/112804 | 9/2008 |
| WO | WO-2008/112806 | 9/2008 |

OTHER PUBLICATIONS

U.S. Appl. No. 10/946,955, filed Sep. 22, 2004, Spooner et al.

U.S. Appl. No. 11/627,414, filed Jan. 26, 2007, Spooner et al.

International Search Report and Written Opinion issued for PCT/US2005/031664, dated Apr. 6, 2005.

Chun-Jen Tsai et al., Model-Based Synthetic View Generation from a Monocular Video Sequence, Image Processing, 1997 Proceedings, IEEE, vol. 1 Oct. 26, 1997, pp. 444-447.

Wurmlin S. et al., "3D Video Fragments: Dynamic point samples for Real-Time Free-Viewpoint Video", Computers and Graphics Elsevier UK, vol. 28 No. 1 Feb. 2004, pp. 3-14.

Labatut, Patrick, et al. "Efficient Multi-View Reconstruction of Large-Scale Scenes Using Interest Points, Triangulation and Graph Cuts," Computer Vision, 2007.ICCV 2007.IEEE 11th International Conference on Oct. 14-21, 2007, pp. 108.

Alexandre X. Falcao et al.; "User-Steered Image Segmentation Paradigms: Live Wire and Live Lane"; Graphical Models and Image Processing, vol. 60, Issue 4 (Jul. 1998); pp. 233-260.

Tony F. Chan et al; "Active Contours Without Edges"; IEEE Transactions on Image Processing; vol. 10, Issue 2, Feb. 2001; pp. 266-277.

G. Vosselman et al.; "Recognising Structure in Laser Scanner Point Clouds"; IAPRS (www.itc.nl/personal/vosselman/papers/vosselman2004.natscan.pdf, 6 pages.

Tamal K. Dey et al.; "Shape Segmentation and Matching from Noisy Point Clouds"; Proc. Eurographics Sympos. Point-Based Graphics (2004), Marc Alexa and S. Rusinkiewicz (eds) (2004), pp. 193-199.

Tamal K. Dey et al.; "Shape Segmentation and Matching with Flow Discretization"; Proc. Workshop Algorithms Data Structures (WADS 03), LNCS 2748, F. Dehen, J.-R. Sack, M. Smid Eds., pp. 1-11, 2003.

International Search Report and Written Opinion issued for PCT/US2008/056673; Dated: Aug. 19, 2008; 9 Pages.

International Search Report and Written Opinion issued for PCT/US2008/056668; Dated: Jul. 14, 2008; 10 pages.

Yang Liu et al.; "Reconstructing B-spline Curves from Point Clouds—A Tangential Flow Approach Using Least Squares Minimization"; Department of Computer Science; The University of Hong Kong; 9 pages, 2005.

Website Interview by Tom Sassoon, Parts I-IV; http://www.variety.com/index.asp?layout=videoBC&bcpid=1529573051; Optical Disk, Jul. 2008.

International Search Report and Written Opinion issued for PCT/US2008/056661; Dated Jul. 14, 2008; 10 Pages.

International Search Report and Written Opinoin issued for PCT/US2008/056719; Dated: Sep. 3, 2008; 9 pages.

International Search Report and Written Opinion issued for PCT/US2008/056697; Dated: Sep. 4, 2008; 10 pages.

International Search Report and Written Opinion issued for PCT/US2008/056716; Dated: Aug. 22, 2008; 8 pages.

International Search Report and Written Opinion issued for PCT/US2008/056388; Dated: Aug. 20, 2008; 9 pages.

International Search Report and Written Opinion issued for PCT/US2008/056384; Dated: Aug. 20, 2008; 11 pages.

* cited by examiner

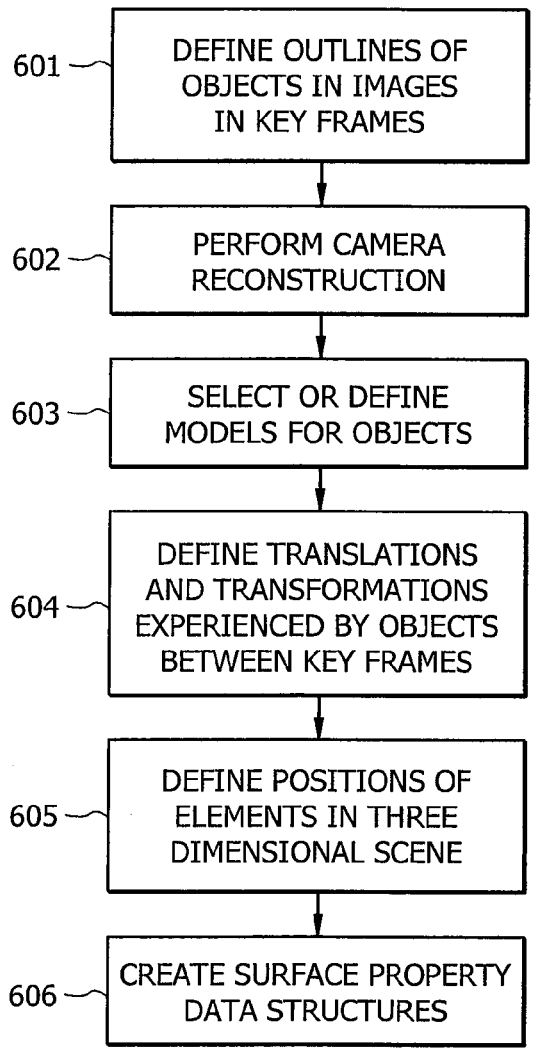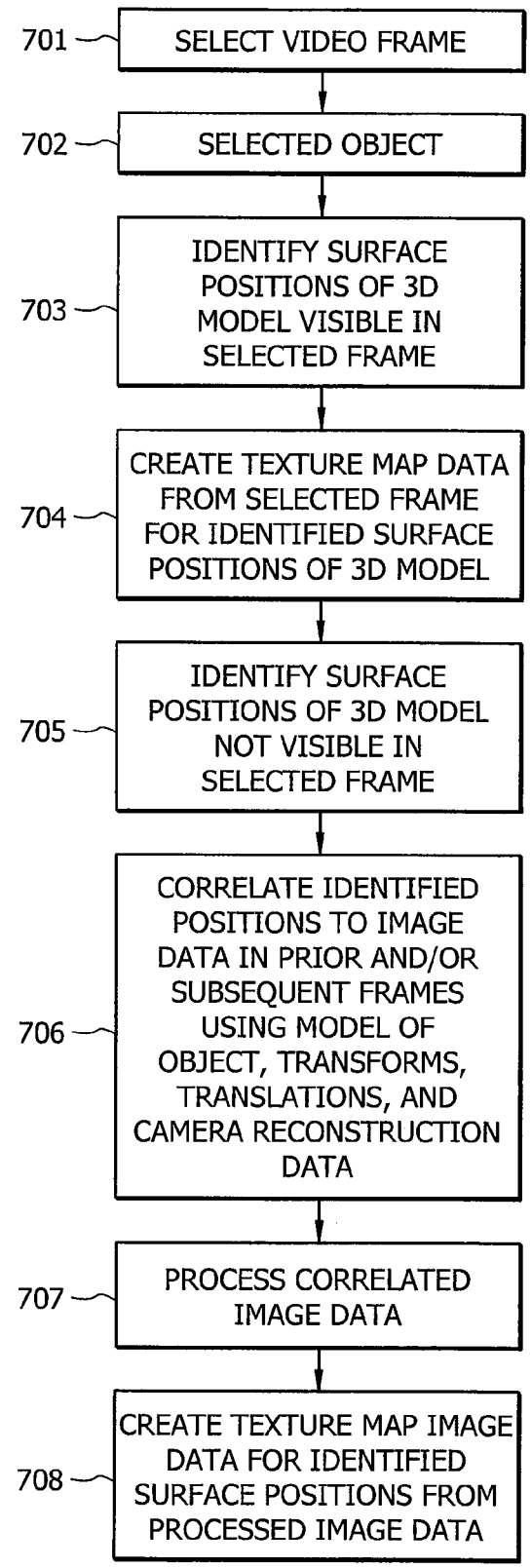

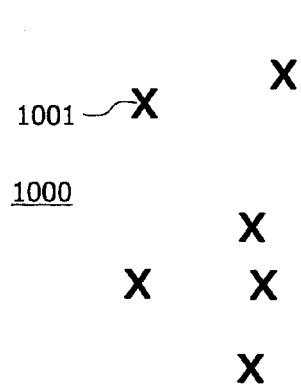
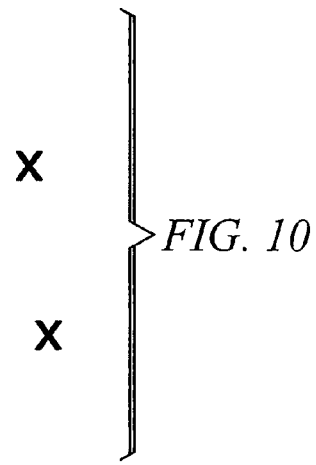
FIG. 10
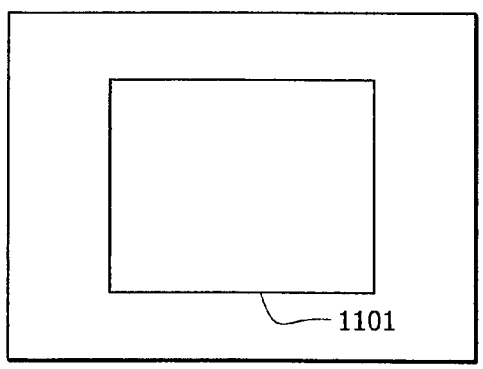
FIG. 11A
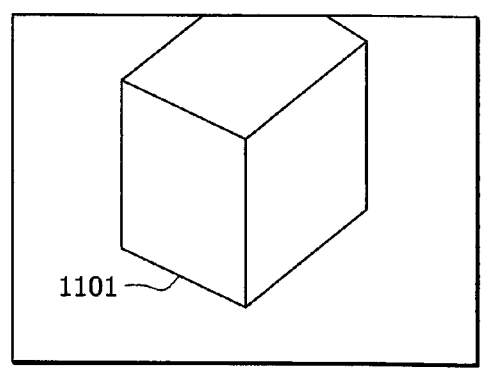
FIG. 11B
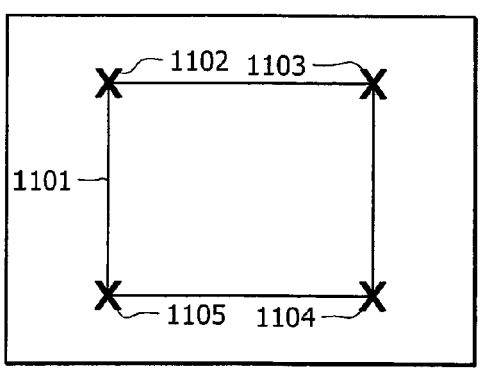
FIG. 11C
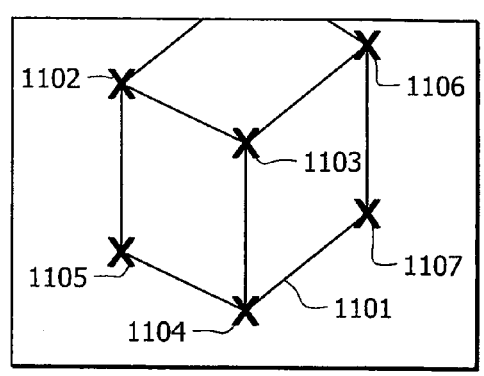
FIG. 11D

SYSTEM AND METHOD FOR PROCESSING VIDEO IMAGES

CROSS-REFERENCE TO RELATED APPLICATIONS

This application is a Continuation of U.S. patent application Ser. No. 12/046,267 filed on Mar. 11, 2008, entitled "SYSTEM AND METHOD FOR PROCESSING VIDEO IMAGES," which is a continuation-in-part of U.S. patent application Ser. No. 10/946,955, filed on Sep. 22, 2004, entitled "SYSTEM AND METHOD FOR PROCESSING VIDEO IMAGES," now U.S. Pat. No. 7,542,034, the disclosures of which are hereby incorporated by reference. The present application also claims priority to U.S. provisional patent application No. 60/894,450, entitled "TWO-DIMENSIONAL TO THREE-DIMENSIONAL CONVERSION," filed Mar. 12, 2007, the disclosure of which is hereby incorporated by reference.

The present application is related to U.S. patent application Ser. No. 11/627,414, entitled "METHODOLOGY FOR 3D SCENE RECONSTRUCTION FROM 2D IMAGE SEQUENCES," filed Jan. 26, 2007; U.S. patent application Ser. No. 12/046,255, entitled "SYSTEMS AND METHODS FOR GENERATING 3-D GEOMETRY USING POINTS FROM IMAGE SEQUENCES," filed Mar. 11, 2008, and U.S. patent application Ser. No. 12/046,279 entitled "SYSTEM AND METHOD FOR PROCESSING VIDEO IMAGES," filed Mar. 11, 2008, the disclosure of which is hereby incorporated by reference.

TECHNICAL FIELD

The present invention is generally directed to processing graphical images, and more specific to processing graphical images using point clouds.

BACKGROUND OF THE INVENTION

A number of technologies have been proposed and, in some cases, implemented to perform a conversion of one or several two dimensional images into one or several stereoscopic three dimensional images. The conversion of two dimensional images into three dimensional images involves creating a pair of stereoscopic images for each three dimensional frame. The stereoscopic images can then be presented to a viewer's left and right eyes using a suitable display device. The image information between respective stereoscopic images differ according to the calculated spatial relationships between the objects in the scene and the viewer of the scene. The difference in the image information enables the viewer to perceive the three dimensional effect.

An example of a conversion technology is described in U.S. Pat. No. 6,477,267 (the '267 patent). In the '267 patent, only selected objects within a given two dimensional image are processed to receive a three dimensional effect in a resulting three dimensional image. In the '267 patent, an object is initially selected for such processing by outlining the object. The selected object is assigned a "depth" value that is representative of the relative distance of the object from the viewer. A lateral displacement of the selected object is performed for each image of a stereoscopic pair of images that depends upon the assigned depth value. Essentially, a "cut-and-paste" operation occurs to create the three dimensional effect. The simple displacement of the object creates a gap or blank region in the object's background. The system disclosed in the '267 patent compensates for the gap by "stretching" the object's background to fill the blank region.

The '267 patent is associated with a number of limitations. Specifically, the stretching operations cause distortion of the object being stretched. The distortion needs to be minimized to reduce visual anomalies. The amount of stretching also corresponds to the disparity or parallax between an object and its background and is a function of their relative distances from the observer. Thus, the relative distances of interacting objects must be kept small.

Another example of a conversion technology is described in U.S. Pat. No. 6,466,205 (the '205 patent). In the '205 patent, a sequence of video frames is processed to select objects and to create "cells" or "mattes" of selected objects that substantially only include information pertaining to their respective objects. A partial occlusion of a selected object by another object in a given frame is addressed by temporally searching through the sequence of video frames to identify other frames in which the same portion of the first object is not occluded. Accordingly, a cell may be created for the full object even though the full object does not appear in any single frame. The advantage of such processing is that gaps or blank regions do not appear when objects are displaced in order to provide a three dimensional effect. Specifically, a portion of the background or other object that would be blank may be filled with graphical information obtained from other frames in the temporal sequence. Accordingly, the rendering of the three dimensional images may occur in an advantageous manner.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF SUMMARY OF THE INVENTION

The present invention is directed to a system and method which The present invention is directed to systems and methods which concern 2-D to 3-D images. The various embodiments of the present invention involve acquiring and processing a sequence of 2-D images, generating camera geometry and static geometry of a scene in those usages and converting the subsequent data into a 3-D rendering of that scene.

One embodiment is a method for forming a three dimensional image of an object that comprise providing at least two images of the object, wherein a first image has a different view of the object than a second image; forming a point cloud for the object using the first image and the second image; and creating the three dimensional image of the object using the point cloud.

BRIEF DESCRIPTION OF THE DRAWINGS

For a more complete understanding of the present invention, reference is now made to the following descriptions taken in conjunction with the accompanying drawing, in which:

FIG. 6 depicts a set of interrelated processes for developing a model of a three dimensional scene from a video sequence according to one representative embodiment.

FIG. 7 depicts a flowchart for generating texture data according to one representative embodiment.

FIG. 10 depicts an example of a point cloud, according to embodiments of the invention.

FIGS. 11A-11D depict using a plurality of 2D image frames to construct a point cloud, according to embodiments of the invention.

DETAILED DESCRIPTION OF THE INVENTION

Figure 1A:
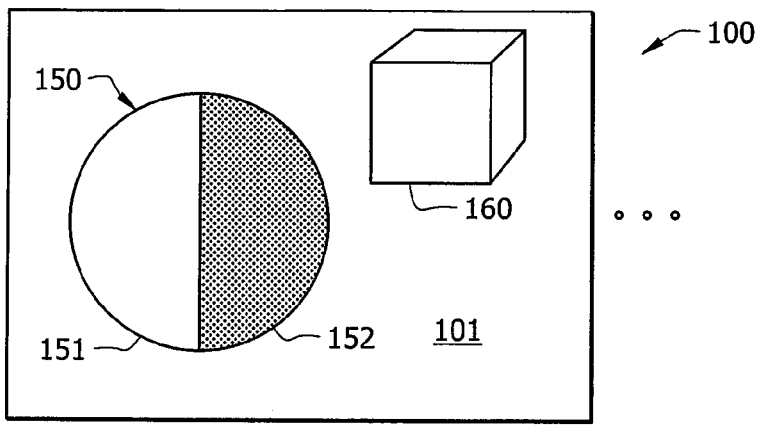
FIG. 1 depicts key frames of a video sequence.
Figure 1B:
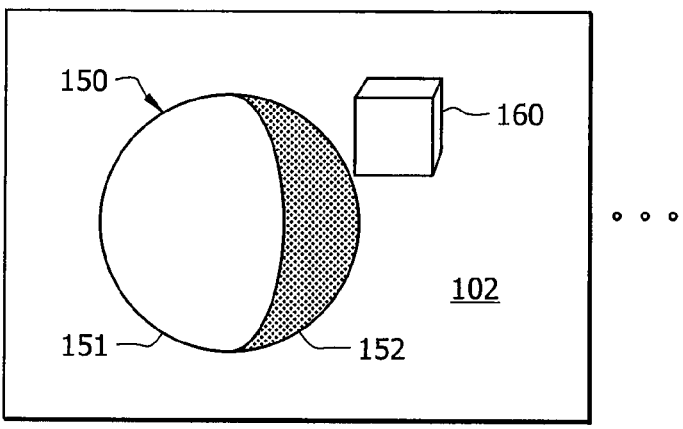
Figure 1C:
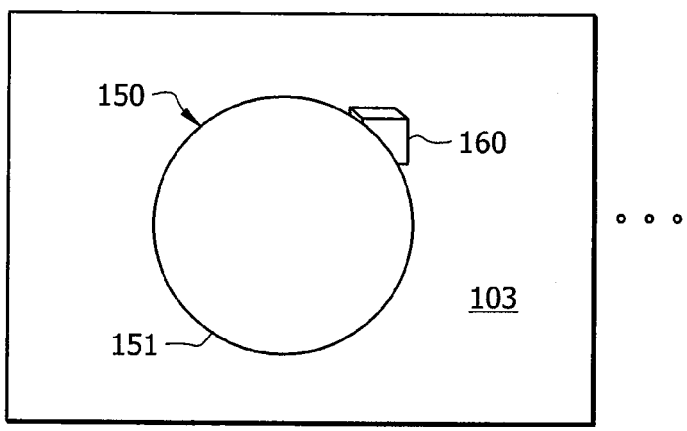
Figure 1D:
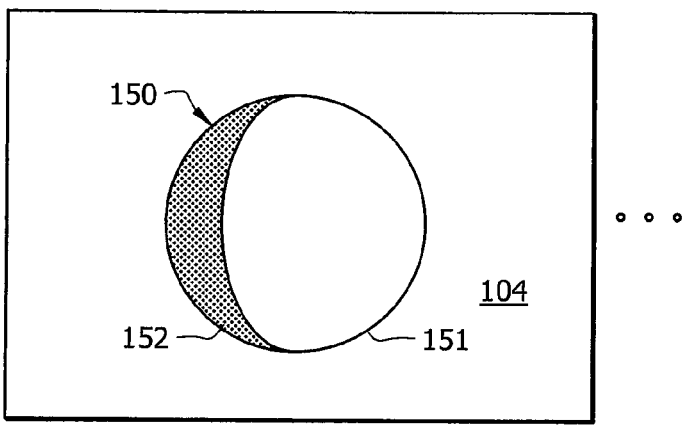

Referring now to the drawings, FIG. 1 depicts sequence 100 of video images that may be processed according to some representative embodiments. Sequence 100 of video images includes key frames 101-104. Multiple other frames may exist between these key frames.

As shown in FIG. 1, sphere 150 possesses multiple tones and/or chromatic content. One half of sphere 150 is rendered using first tone 151 and the other half of sphere 150 is rendered using second tone 152. Sphere 150 undergoes rotational transforms through video sequence 100. Accordingly, in key frame 102, a greater amount of tone 151 is seen relative to key frame 101. In key frame 103, sufficient rotation has occurred to cause only tone 151 of sphere 150 to be visible. In key frame 104, tone 152 becomes visible again on the opposite side of sphere 150 as compared to the position of tone 152 in key frame 101.

Box 160 is subjected to scaling transformations in video sequence 100. Specifically, box 160 becomes smaller throughout video sequence 100. Moreover, box 160 is translated during video sequence 100. Eventually, the motion of box 160 causes box 160 to be occluded by sphere 150. In key frame 104, box 160 is no longer visible.

According to known image processing techniques, the generation of stereoscopic images for key frame 103 would occur by segmenting or matting sphere 150 from key frame 103. The segmented or matted image data for sphere 150 would consist of a single tone (i.e., tone 151). The segmented or matted image data may be displaced in the stereoscopic views. Additionally, image filling or object stretching may occur to address empty regions caused by the displacement. The limitations associated with some known image processing techniques are seen by the inability to accurately render the multi-tone surface characteristics of sphere 150. Specifically, because the generation of stereoscopic views according to known image processing techniques only uses the matted or segmented image data, known techniques would render sphere 150 as a single-tone object in both the right and left images of a stereoscopic pair of images. However, such rendering deviates from the views that would be actually produced in a three dimensional scene. In an actual three dimensional scene, the right view may cause a portion of tone 152 to be visible on the right side of sphere 150. Likewise, the left view may cause a portion of tone 152 to be visible on the left side of sphere 150.

Figure 2:
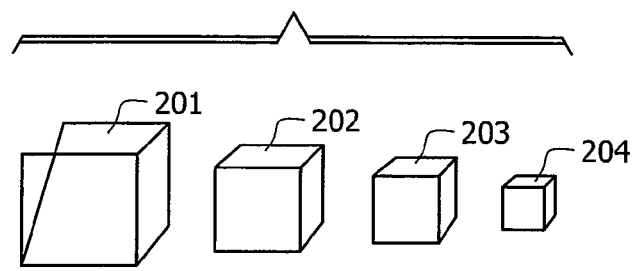
FIG. 2 depicts representations of an object from the video sequence shown in FIG. 1 generated according to one representative embodiment.

Representative embodiments enable a greater degree of accuracy to be achieved when rendering stereoscopic images by creating three dimensional models of objects within the images being processed. A single three dimensional model may be created for box 160. Additionally, the scaling transformations experienced by box 160 may be encoded with the model created for box 160. Representations 201-204 of box 160 as shown in FIG. 2 correspond to the key frames 101-104. Additionally, it is noted that box 160 is not explicitly present in key frame 104. However, because the scaling transformations and translations can be identified and encoded, representation 204 of box 160 may be created for key frame 104. The creation of a representation for an object that is not visible in a key frame may be useful to enable a number of effects. For example, an object removal operation may be selected to remove sphere 150 thereby causing box 160 to be visible in the resulting processed image(s).

In a similar manner, a three dimensional model may be selected or created for sphere 150. The rotational transform information associated with sphere 150 may be encoded in association with the three dimensional model.

Figure 3:
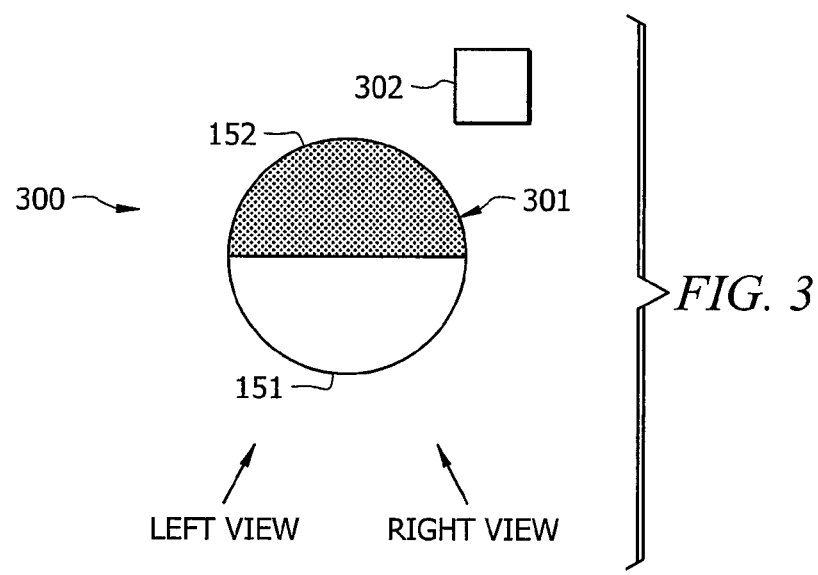
FIG. 3 depicts an "overhead" view of a three dimensional scene generated according to one representative embodiment.

Using the three dimensional models and camera reconstruction information, a three dimensional scene including the locations of the objects within the scene may be defined. FIG. 3 depicts an "overhead" view of scene 300 including three dimensional model 301 of sphere 150 and three dimensional model 302 of box 160 that correspond to key frame 103. As shown in FIG. 3, tone 152 is generally facing away from the viewing perspectives and tone 151 is generally facing toward the viewing perspectives. However, because the right view is slightly offset, a portion of tone 152 is visible. Also, a smaller amount of three dimensional model 302 of box 160 is occluded by three dimensional model 301 of sphere 150.

Figure 4:
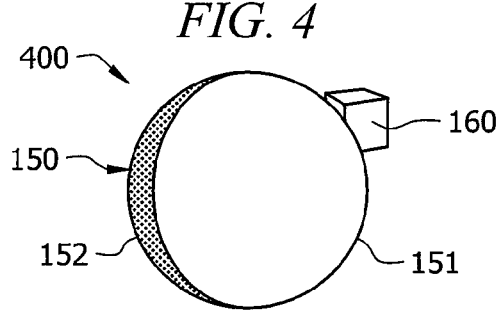
FIGS. 4 and 5 depict stereoscopic images generated according to one representative embodiment.
Figure 5:
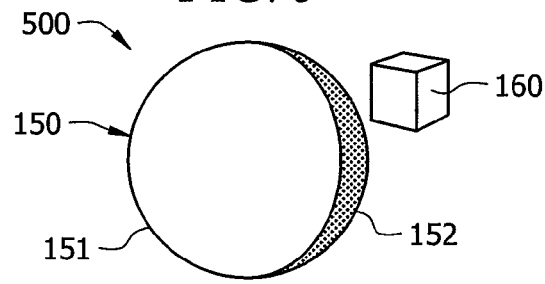

Using three dimensional scene 300, left image 400 and right image 500 may be generated as shown in FIGS. 4 and 5. Specifically, three dimensional scene 300 defines which objects are visible, the position of the objects, and the sizes of the objects for the left and right views. The rendering of the objects in the views may occur by mapping image data onto the three dimensional objects using texture mapping techniques. The encoded transform information may be used to perform the texture mapping in an accurate manner. For example, the rotation transform information encoded for sphere 150 enables the left portion of sphere 150 to include tone 152 in left image 400. The transform information enables the right portion of sphere 150 to include tone 152 in right image 500. Specifically, image data associated with tone 152 in key frames 102 and 104 may be mapped onto the appropriate portions of sphere 150 in images 400 and 500 using the transform information. Likewise, the surface characteristics of the portion of box 160 that has become visible in image 500 may be appropriately rendered using information from key frame 102 and the transform information.

Figure 9:
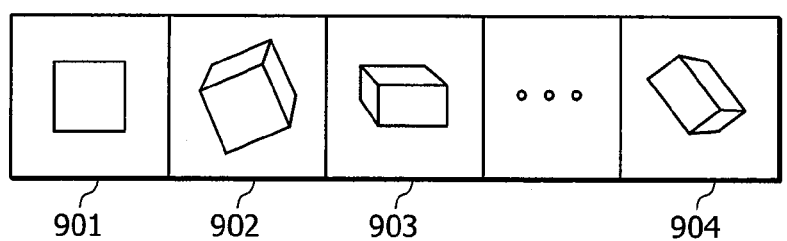
FIG. 9 depicts a set of frames in which objects may be represented using three dimensional models according to one representative embodiment.

To further illustrate the operation of some embodiments, reference is made to FIG. 9. FIG. 9 depict a set of video frames in which a box is rotating in two axes. Using conventional matte modeling techniques, an object matte would be created for each of frames 901-904, because the two dimensional representation of the box is different in each of the frames. The creation of respective object mattes for each of frames 901-904 may then be a time consuming and cumbersome process. However, according to one representative embodiment, an object model is created for frame 901. Because the three dimensional characteristics of the box do not change, only the rotation information may be defined for frames 902-904. The surface characteristics of the box can then be autonomously extracted from frames 902-904 using the object model and the transform information. Thus, some representative embodiments provide a more efficient process for processing video frames than conventional techniques.

FIG. 6 depicts an interrelated set of processes for defining three dimensional objects from video images according to one representative embodiment. In process 601, outlines of objects of interest are defined in selected frames. The outline of the objects may occur in a semi-autonomous manner. The user may manually select a relatively small number of points of the edge of a respective object. An edge tracking algorithm may then be used to identify the outline of the object between the user selected points. In general, edge tracking algorithms operate by determining the least path cost between two points where the path cost is a function of image gradient characteristics. Domain-specific information concerning the selected object may also be employed during edge tracking. A series of Bezier curves or other parametric curves may be used to encode the outlines of the objects. Further user input may be used to refine the curves if desired.

In process 602, camera reconstruction may be performed. Camera reconstruction refers to the process in which the relationship between the camera and the three dimensional scene(s) in the video sequence is analyzed. During this process, the camera's focal length, the camera's relative angular perspective, the camera's position and orientation relative to objects in the scene, and/or other suitable information may be estimated.

In process 603, three dimensional models are created or selected from a library of predefined three dimensional models for the objects. Any number of suitable model formats could be used. For example, Constructive Solid Geometry models could be employed in which each object is represented as a combination of object primitives (e.g., blocks, cylinders, cones, spheres, etc.) and logical operations on the primitives (e.g., union, difference, intersection, etc.). Additionally or alternatively, nonuniform rational B-splines (NURBS) models could be employed in which objects are defined in terms of sets of weighted control points, curve orders, and knot vectors. Additionally, "skeleton" model elements could be defined to facilitate image processing associated with complex motion of an object through a video sequence according to kinematic animation techniques.

In process 604, transformations and translations are defined as experienced by the objects of interest between key frames. Specifically, the translation or displacement of objects, the scaling of objects, the rotation of objects, morphing of objects, and/or the like may be defined. For example, an object may increase in size between key frames. The increase in size may result from the object approaching the camera or from the object actually become larger ("ballooning"). By accurately encoding whether the object has been increased in size as opposed to merely moving in the three dimensional scene, subsequent processing may occur more accurately. This step may be performed using a combination of autonomous algorithms and user input. For example, motion compensation algorithms may be used to estimate the translation of objects. If an object has experienced scaling, the user may identify that scaling has occurred and an autonomous algorithm may calculate a scaling factor by comparing image outlines between the key frames.

In process 605, using the information developed in the prior steps, the positions of objects in the three dimensional scene(s) of the video sequence are defined. The definition of the positions may occur in an autonomous manner. User input may be received to alter the positions of objects for editing or other purposes. Additionally, one or several objects may be removed if desired.

In process 606, surface property data structures, such as texture maps, are created.

FIG. 7 depicts a flowchart for creating texture map data for a three dimensional object for a particular temporal position according to one representative embodiment. The flowchart for creating texture map data begins in step 701 where a video frame is selected. The selected video frame identifies the temporal position for which the texture map generation will occur. In step 702, an object from the selected video frame is selected.

In step 703, surface positions of the three dimensional model that correspond to visible portions of the selected object in the selected frame are identified. The identification of the visible surface positions may be performed, as an example, by employing ray tracing from the original camera position to positions on the three dimensional model using the camera reconstruction data. In step 704, texture map data is created from image data in the selected frame for the identified portions of the three dimensional model.

In step 706, surface positions of the three dimensional model that correspond to portions of the object that were not originally visible in the selected frame are identified. In one embodiment, the entire remaining surface positions are identified in step 706 thereby causing as much texture map data to be created for the selected frame as possible. In certain situations, it may be desirable to limit construction of the texture data. For example, if texture data is generated on demand, it may be desirable to only identify surface positions in this step (i) that correspond to portions of the object not originally visible in the selected frame and (ii) that have become visible due to rendering the object according to a modification in the viewpoint. In this case, the amount of the object surface exposed due to the perspective change can be calculated from the object's camera distance and a maximum inter-ocular constant.

In step 706, the surface positions identified in step 705 are correlated to image data in frames prior to and/or subsequent to the selected frame using the defined model of the object, object transformations and translations, and camera reconstruction data. In step 707, the image data from the other frames is subjected to processing according to the transformations, translations, and camera reconstruction data. For example, if a scaling transformation occurred between frames, the image data in the prior or subject frame may be either enlarged or reduced depending upon the scaling factor. Other suitable processing may occur. In one representative embodiment, weighted average processing may be used depending upon how close in the temporal domain the correlated image data is to the selected frame. For example, lighting characteristics may change between frames. The weighted averaging may cause darker pixels to be lightened to match the lighting levels in the selected frame. In one representative embodiment, light sources are also modeled as objects. When models are created for light sources, lighting effects associated with the modeled objects may be removed from the generated textures. The lighting effects would then be reintroduced during rendering.

In step 708, texture map data is created for the surface positions identified in step 705 from the data processed in step 707. Because the translations, transformations, and other suitable information are used in the image data processing, the texture mapping of image data from other frames onto the three dimensional models occurs in a relatively accurate manner. Specifically, significant discontinuities and other imaging artifacts generally will not be observable.

In one representative embodiment, steps 704-707 are implemented in association with generating texture data structures that represent the surface characteristics of an object of interest. A given set of texture data structures define all of the surface characteristics of an object that may be recovered from a video sequence. Also, because the surface characteristics may vary over time, a texture data structure may be assigned for each relevant frame. Accordingly, the texture data structures may be considered to capture video information related to a particular object.

The combined sets of data (object model, transform information, camera reconstruction information, and texture data structures) enables construction of a three dimensional world from the video sequence. The three dimensional world may be used to support any number of image processing effects. As previously mentioned, stereoscopic images may be created. The stereoscopic images may approximately correspond to the original two dimensional viewpoint. Alternatively, stereoscopic images may be decoupled from the viewpoint(s) of the original video if image data is available from a sufficient number of perspectives. Additionally, object removal may be performed to remove objects from frames of a video sequence. Likewise, object insertion may be performed.

Figure 8:
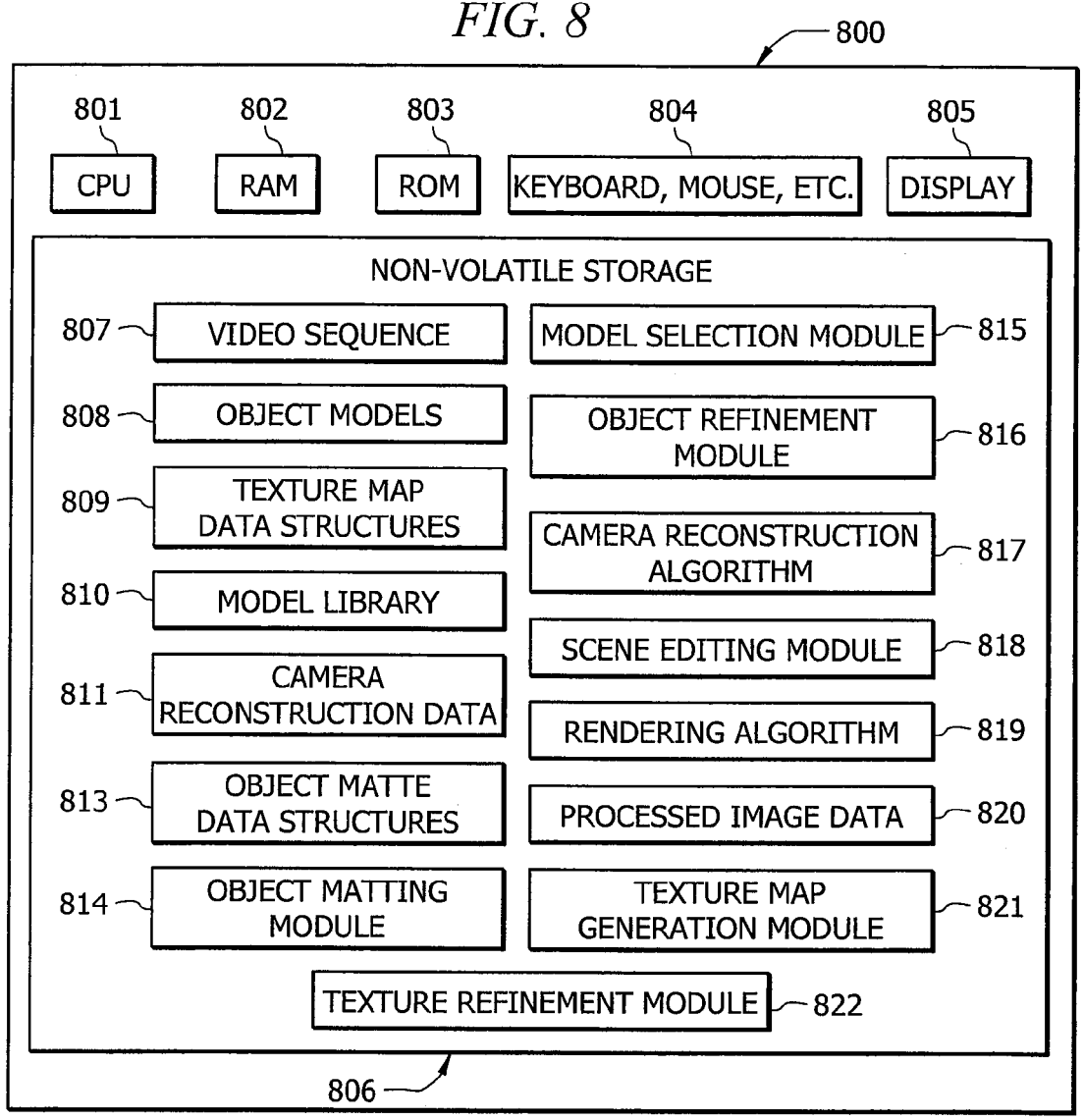
FIG. 8 depicts a system implemented according to one representative embodiment.

FIG. 8 depicts system 800 for processing a sequence of video images according to one representative embodiment. System 800 may be implemented on a suitable computer platform. System 800 includes conventional computing resources such as central processing unit 801, random access memory (RAM) 802, read only memory (ROM) 803, user peripherals (e.g., keyboard, mouse, etc.) 804, and display 805. System 800 further includes non-volatile storage 806.

Non-volatile storage 806 comprises data structures and software code or instructions that enable conventional processing resources to implement some representative embodiments. The data structures and code may implement the flowcharts of FIGS. 6 and 7 as examples.

As shown in FIG. 8, non-volatile storage 806 comprises video sequence 807. Video sequence 807 may be obtained in digital form from another suitable medium (not shown). Alternatively, video sequence 807 may be obtained after analog-to-digital conversation of an analog video signal from an imaging device (e.g., a video cassette player or video camera). Object matting module 814 defines outlines of selected objects using a suitable image processing algorithm or algorithms and user input. Camera reconstruction algorithm 817 processes video sequence 807 to determine the relationship between objects in video sequence 807 and the camera used to capture the images. Camera reconstruction algorithm 817 stores the data in camera reconstruction data 811.

Model selection module 815 enables model templates from model library 810 to be associated with objects in video sequence 807. The selection of models for objects are stored in object models 808. Object refinement module 816 generates and encodes transformation data within object models 808 in video sequence 807 using user input and autonomous algorithms. Object models 808 may represent an animated geometry encoding shape, transformation, and position data over time. Object models 808 may be hierarchical and may have an associated template type (e.g., a chair).

Texture map generation module 821 generates textures that represent the surface characteristics of objects in video sequence 807. Texture map generation module 821 uses object models 808 and camera data 811 to generate texture map data structures 809. Preferably, each object comprises a texture map for each key frame that depicts as much surface characteristics as possible given the number of perspectives in video sequence 807 of the objects and the occlusions of the objects. In particular, texture map generation module 821 performs searches in prior frames and/or subsequent frames to obtain surface characteristic data that is not present in a current frame. The translation and transform data is used to place the surface characteristics from the other frames in the appropriate portions of texture map data structures 809. Also, the transform data may be used to scale, morph, or otherwise process the data from the other frames so that the processed data matches the characteristics of the texture data obtained from the current frame. Texture refinement module 822 may be used to perform user editing of the generated textures if desired.

Scene editing module 818 enables the user to define how processed image data 820 is to be created. For example, the user may define how the left and right perspectives are to be defined for stereoscopic images if a three dimensional effect is desired. Alternatively, the user may provide suitable input to create a two dimensional video sequence having other image processing effects if desired. Object insertion and removal may occur through the receipt of user input to identify objects to be inserted and/or removed and the frames for these effects. Additionally, the user may change object positions.

When the user finishes inputting data via scene editing module 818, the user may employ rendering algorithm 819 to generate processed image data 820. Processed image data 820 is constructed using object models 808, texture map data structures 809, and other suitable information to provide the desired image processing effects.

One manner to define objects is to use point clouds. Point clouds allow 2D to 3D conversions by deconstructing the entire perceived environment in a 2D frame. A typical 2D frame may have a plurality of objects. Each object, as well as the background scene, would be deconstructed using point clouds. Using point clouds would allow for true distances from the camera to be reconstructed, as well as camera movement can be reconstructed. Each point in a point cloud comprises X, Y, and Z coordinates, and may comprise movement information.

For example, from a plurality of 2D images, using the various method of camera reconstruction and pixel tracking described herein, the movements of the various pixels though a plurality of 2D images are defined by tracking features through out the 2D images. Note that the images may be a plurality of frames from a movie, or may be a plurality of still images, or a combination of one or more still images and one or more frames from a movie. From this information, various camera variables can then be derived in terms of the lens, such as a look vector, position orientation, etc. Thus, what were once 2D pixel coordinates are not 3D coordinates relative to the lens. This allows for camera recreation and its movement (if any), and accurately positioned features, that may be marked by features, edges, and shapes within the 3D modeled scene. The point clouds allow for a geometry that is representative and mathematically correct for any of the given object in the image frame. This in turn allows for various manipulations of the scene to be in acted, e.g. temporal filing, occlusion operations, object manipulation, object insertion, object deletion, etc.

The mathematics behind the 2D to 3D conversion operates by examining a 2D features in a sequence of images, and provided that the camera has a certain amount of parallax over time, then 2D points are triangulated to an optimal 3D position. This optimizes the 3D points, as well as the camera position and orientation, at the same time. An iterative approach can be used to optimize the camera solution. Note that the embodiments recreates the scene including the various objects of the 2D frame in 3D, while current technology is used to inject new information, e.g. new objects, into the 2D images, such that the new information is mathematically correct with the surrounding pixel information. Currently technology, matches the movement of the camera with the new information being placed into the 2D scene.

A point cloud is a collection of virtual tracking markers that are associated with particular pixels of features of a scene. FIG. 10 depicts an example of a point cloud 1000 that comprises a plurality of points, for example point 1001.

The point cloud may be formed in a variety of manners. For example, a user or artist, may mark particular points on one or more 2D images. A computer program, using edge detection, shape detection, object detection, or various combinations, may mark particular points on one or more 2D images. Another way to form a point cloud is to use a laser to sweep that actual scene that will be imaged. The actual distance and placement information is then recorded and is used to form the point cloud.

In any event, the manner in which the points move frame-to-frame determine size and distance of the objects. For example, an object closer to the camera, moves differently than a object that is distant from the camera. Thus, by analyzing the movement of these pixels and the differences in the movements of these pixels, the size and placement of the various objects can be determined. From this information, the type of camera that was used to capture the images and its movements as it captured each of the frames can be derived. Note that the analysis is based on a set of known variables, such as lens parameters and focal axis. Other energy emitters may be used such as sonar, radar, or other type of range finding sensors instead of lasers.

FIG. 11A depicts a first 2D image showing an object 1101 and FIG. 11B depicts a second 2D image showing the object 1101 from a different angle. Using these two views, a point cloud comprising at least six points, 1102-1107 is formed. FIGS. 11C and 11D depict the 2D views of FIGS. 11A and 11B respectively with the points of the point cloud.

Point clouds may be static point clouds or dynamic point clouds. A scene may comprise one or more point clouds and may comprise all static or all dynamic point clouds, or combination of one or more of each. In a static point cloud, each point comprises three dimensional location information, e.g. XYZ coordinates, and no movement data. The X and Y coordinates would refer to the objects left/right location and up/down location, while the Z coordinate is distance from the camera. Note that other coordinate systems may be used, such as polar coordinates, altitude-azimuth coordinates, etc., as long as a point may be located in three dimensions. In a dynamic point cloud, each point comprises three dimensional location information and movement information. Note that in a dynamic point cloud, the camera may be stationary while the object moves, or the object may move while the camera is stationary, or both may move relative to each other and/or reference coordinate system.

A point cloud for an object may be have one or more points. A simple, static object may be represented by one point. For example, one point may be used to mark the location of a symmetrical object, e.g. a sphere. However, the more points that are used tends to yield better results as any noise or error will be averaged out. Also, more points will be able to better track fine detail of objects. The points used to define an object are points that correspond to features of the object that are readily distinguishable by a person or a computer, e.g. an edge, a change in texture, a change in color, a hole, etc. For points selected through laser scanning, the points may not correspond to any particular features.

Once the point cloud has been constructed for a scene, additional frames of 2D images involving the scene can be readily converted to 3D images. Thus, for a movie, once a particular scene has been converted into a point cloud, all (or as many that are desired) of the 2D frames of the movie can be converted into 3D images. Moreover, the scene can be manipulated, by adding/deleting objects, changing objects, etc. For example, a common error in movies is a continuity error, where an object is missing or out place from one shot to another shot involving the same scene. Once the point cloud has been constructed, the object can readily be inserted or moved to its correct position.

A point cloud can also be used to recreate a camera that was used to form a 2D image. The recreated camera will line up with real world coordinates to all of the points within the point cloud. The recreated camera will be used to produce 3D images using the point of view that was used to form the 2D images. Thus, the 3D image sequence will match the 2D image sequence in a movie.

Figure 12:
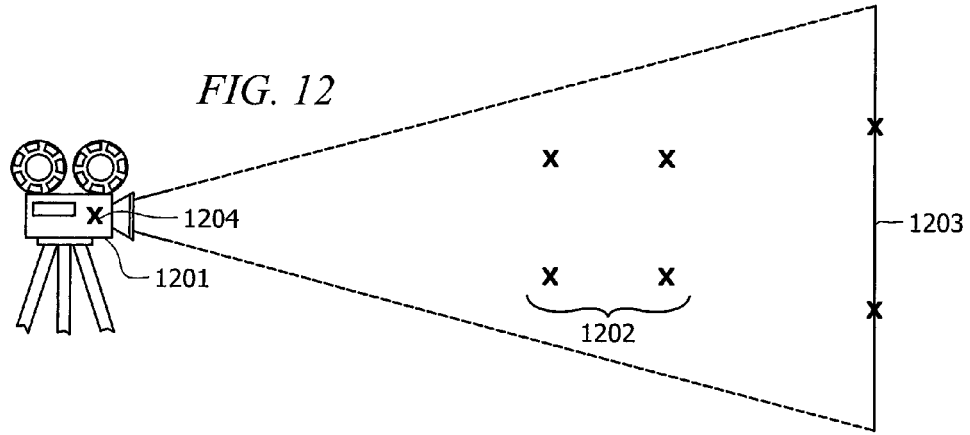
FIG. 12 depicts using a point cloud to recreate a camera, according to embodiments of the invention.

As shown in FIG. 12, a known point cloud of object 1202 is located in a 3D scene. Thus, a 2D image that includes a 2D view 1203 of object 1202 can only have resulted if camera 1201 was placed at location 1204. Thus, for a plurality of 2D images, the camera location can be determined for each image if a known object is present in each image. Camera creation from the point cloud is performed by associating a set of 3D points from the cloud to 2D tracked points within the image. Camera creation or calibration is then performed using the 3D points as guides to create the camera. In the case of difficult tracks additional 3D points can be associated to 2D tracks to help refine and smooth the resulting camera.

Figure 13A:
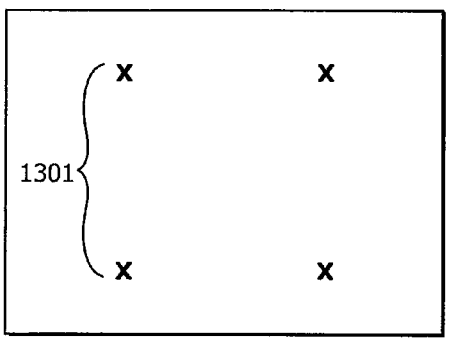
FIGS. 13A and 13B depict using a point cloud to form an object in 3D, according to embodiments of the invention.
Figure 13B:
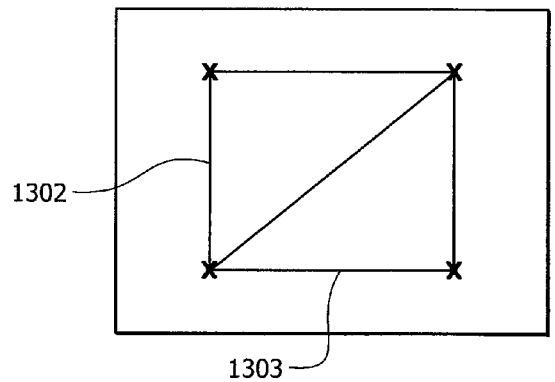
Figure 14:
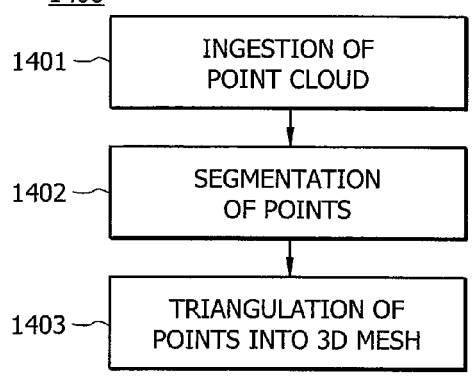
FIG. 14 depicts a method of using a point cloud to form an object in 3D, according to embodiments of the invention.

Point clouds can be used to form objects in 3D images. Once a point cloud has been placed in the 3D scene various imaging techniques can be used to form a mesh. For example, triangular mesh. In FIG. 13A, point cloud 1301 representing an object has been placed in a scene. In FIG. 13B, using triangular mesh, an object has been created from triangles 1302 and 1302. FIG. 14 depicts an exemplary method for constructing objects using such mesh techniques. First the point cloud is ingested, block 1401. Next the points are segregated into a group representing the object in the scene. The segregation can be done automatically taking a tolerance of points depth within the region depicted by a mask or via any other algorithm that sees fit. Manual selection of points can also be performed via a user selecting or lassoing points into a suitable group. The groups can then be tested and have any outliers removed from the data set. Last, the points are triangulated into a 3D mesh to form the object. The generation of a 3D mesh can be done via various computer science methods, for example one such method of mesh creation is via delauney triangulation. The basis behind this algorithm is to generate a convex hull of the points and then use tessellation to generate the triangles for the mesh. Once the flat mesh has been generated, depth can be assigned via manipulation and subdivision of the mesh based on the point group. Other methods can also be used to generate the meshes from subset of the point cloud, for example, Labatut, Patrick; Pons, Jean-Phillippe; Keriven, Renaud; "Efficient Multi-View Reconstruction of Large-Scale Scenes Using Interest Points, Triangulation and Graph Cuts", Computer Vision, 2007.ICCV 2007.IEEE 11$^{th}$ International Conference on 14-21 Oct. 2007, pp. 1-8, incorporated herein by reference.

Note that this model does not have to adhere to post production or visual effects based models. The model does not have to be a triangle mesh, the model can be represented through other forms. For example, the model may be represented as a gradient. Such that the object may be represented by a displacement map or depth map, where the various points can be connected by conceptual lines. The depth map denotes the varying depths of the object with respect to the camera.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for forming a three dimensional image of an object comprising:
   providing, to a processor, at least two images of the object, wherein a first image has a different view of the object than a second image and wherein the images are of a scene and the object is located within the scene;
   forming a point cloud for the object using the first image and the second image;
   analyzing movement of pixels of features of said scene to determine size and placement of objects in said scene; and
   creating, by said processor, the three dimensional image of the object using the point cloud, wherein the point cloud comprises points that comprise X, Y, Z coordinates and wherein the point cloud comprises points from each of said first and second images.

2. The method of claim 1, wherein the forming the point cloud comprises:
   selecting a plurality of points of the object in the images.

3. The method of claim 2, wherein the selecting is performed by a user.

4. The method of claim 2, wherein the selecting is performed by a computer.

5. The method of claim 2, wherein the plurality of points comprises at least one
   of a feature of the object, an edge of the object, a shape of the object, a color change of the object, and a change of texture of the object.

6. The method of claim 1, wherein forming the point cloud comprises:
   sweeping the object with an energy emitter; and
   recording distance and placement information for a plurality of points of the object.

7. The method of claim 1, wherein the images are frames of a movie.

8. The method of claim 1, wherein the point cloud is a static point cloud.

9. The method of claim 1, wherein the point cloud is a dynamic point cloud and each point comprises movement data for the point.

10. The method of claim 1, wherein the creating comprises: using a triangular mesh technique to form the object.

11. The method of claim 1, wherein the creating comprises: using a gradient technique to form the object.

12. The method of claim 1, wherein the creating comprises: using a depth map to form the object.

13. The method of claim 1, further comprising:
    placing the three dimensional image of the object into an image of a scene.

14. The method of claim 1 further comprising:
    moving said object to a correct position in said scene.

* * * * *